United States Patent [19]
Yamasaki

[11] 3,956,943
[45] May 18, 1976

[54] BICYCLE SPROCKET WHEEL
[75] Inventor: Kazuto Yamasaki, Sakai, Japan
[73] Assignee: Maeda Industries, Ltd., Sakai, Japan
[22] Filed: Oct. 5, 1973
[21] Appl. No.: 403,836

[30] Foreign Application Priority Data
Oct. 25, 1972   Japan.............................. 47-122954

[52] U.S. Cl................................ 74/243 R; 74/229
[51] Int. Cl.² ........................................ F16H 55/30
[58] Field of Search...... 74/243 R, 217 B, 242.14 B,
74/242.15 B, 242.11 B, 216.5, 229

[56]         References Cited
         UNITED STATES PATENTS
536,813    4/1895   Macphail et al. ................. 74/243 R
1,583,221  5/1926   Carlson ............................ 74/243 R
3,498,148  3/1970   Gerbasi et al ...................... 74/229
3,756,091  9/1973   Miller ............................... 74/243 R
3,772,932  11/1973  Nagano ............................ 74/217 B Primary Examiner—Samuel Scott
Assistant Examiner—Allan R. Burke
Attorney, Agent, or Firm—Stewart and Kolasch, Ltd.

[57]            ABSTRACT

A bicycle sprocket wheel comprising a multi-speed free wheel assembly containing teeth thereof are set right and left alternatively for ensuring easier engagement with a running chain during gear change operation.

4 Claims, 6 Drawing Figures

BICYCLE SPROCKET WHEEL

BACKGROUND AND SUMMARY OF THE INVENTION

The present invention relates to a bicycle sprocket wheel, and more particularly to an improvement in a rear sprocket wheel which is a basic element of a multi-speed free wheel assembly mounted on a rear wheel hub of a bicycle for facilitating speed change.

The multi-speed free wheel assembly of a bicycle generally has a plurality of rear sprocket wheels which are different in diameter as well as in number of teeth and are coaxially mounted in order in parallel to one another on a rear wheel hub. The rear sprocket wheels cooperate for speed change with a derailleur (chain shifting device) and an endless driving chain which is stretched, through said derailleur, between a rear sprocket wheel and a front sprocket wheel connected to a driving crank. The driving chain is adapted to engageably shift from one sprocket wheel onto another when the derailleur is controlled, whereby a desired speed change is carried out.

In this speed change operation, it is most important that the running chain can be smoothly and quickly shifted to a selected gear position without disengagement from the free wheel assembly. In order to acquire this function, it has heretofore been proposed to tip the teeth of the sprocket wheel rather sharply or to reduce the thickness of each sprocket wheel. It has also been proposed to minimize the distance between adjacent sprocket wheels for easier shifting of the chain. These heretofore proposed prior arts solutions have proved to be effective to some extent, however, the results have not been entirely satisfactory. Thus, unexpected chain disengagement during gear change continues to trouble the cyclist almost as much as ever.

As well known in the bicycle manufacturing field, the gear change is performed in the manner as follows: Upon the derailleur being swung in one selected direction, a part of the chain which is passing through the derailleur is also swung together, so that the part which has been swung may be shifted from an initial sprocket wheel onto a desired one, that is, positioned in the same direction as said derailleur is swung. Consequently, such chain part, running ahead of said swung part, is forced to leave the initial sprocket wheel by the pulling action of the aforementioned chain part that has just been swung onto the desired sprocket wheel by means of said derailleur, and starts to gradually, engageably ride onto the latter as the initial and the desired sprocket wheels coaxially rotate. At this stage, it should be noted that the running chain will not be allowed to easily mesh with the desired sprocket wheel unless the chain is maintained tense during the shifting operation. In other words, as long as the chain is maintained in tension, it can be pulled up onto the desired sprocket wheel at any rate as the same rotates.

In the course of shifting, the chain frequently collides with the side wall of the first accessible tooth that it comes across and is thereby prevented from catching said tooth firmly. If the chain fails to catch the said first tooth, the second or the third teeth that follow in order must obviously be caught instead of said first tooth, otherwise the chain tension will be excessively loosened and finally the chain will fall off the sprocket wheel.

In the conventional sprocket wheel, however, once the chain fails to catch the first tooth, the second or the third teeth cannot be easily caught because each of these teeth is identically formed and arranged into line along the circumference of the sprocket wheel so that the side wall of these teeth all lie in the same plane. Affordingly there is no engageable means for the chain to catch the teeth. As a result, the chain is required to run skiddingly along a series of aligned side walls of the sprocket teeth without developing a driving force.

The fact is also well known in the bicycle field that the running chain is liable to fail to mesh with the sprocket teeth, especially in the case where it shifts from a smaller sprocket wheel onto a larger one. In this case the chain must climb up the side wall of the larger sprocket wheel in order to come into engagement with the sprocket teeth. Further, every tooth end of the conventional arrangement lies slightly back from either of the side walls of the sprocket wheel body, that is, there exists a constant small distance between every tooth end and the side wall surface of the sprocket wheel body. This small distance occasionally adversely affects the chain catches when it the sprocket teeth, since the flexibility of the chain is quite limited. Thus, the disadvantages in conventional sprocket wheels are patently obvious.

The present invention contemplates an improvement over known bicycle sprocket wheels, in which the foregoing and other disadvantages are substantially overcome. According to the present invention, the teeth of the sprocket wheel are bilaterally zigzaged like those of saw blades, whereby the chain can be shifted more quickly and smoothly even from "top" to "low", that is, from the smallest sprocket wheel to the largest one.

It is, therefore, the principal object of the present invention to provide an improved sprocket wheel for a multi-speed free wheel assembly for a bicycle, wherein the teeth of the sprocket wheel are alternately set, right and left, for achieving a more efficient gear change. Further objects and novel features of the present invention will become more apparent from the following detailed description when the same is read in connection with the accompanying drawings. It is to be expressly understood, however, that the drawings are for purpose of illustration only and are not intended as a definition of the limits of the present invention.

BRIEF DESCRIPTION OF THE DRAWINGS

The presnet invention will become more fully understood from the detailed description given hereinbelow and the accompanying drawings which are given by way of illustration only, and thus are not limitative of the present invention and wherein.

Figure 1:
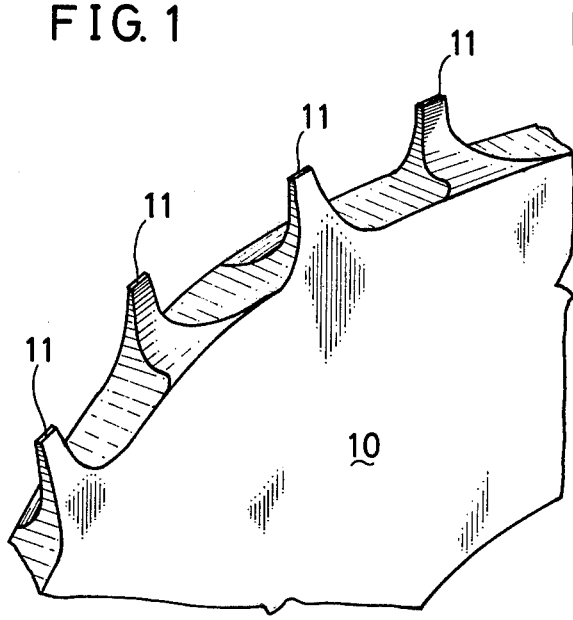
FIG. 1 is a perspective illustration of a part of the bicycle sprocket wheel embodied in accordance with the present invention.
Figure 2:
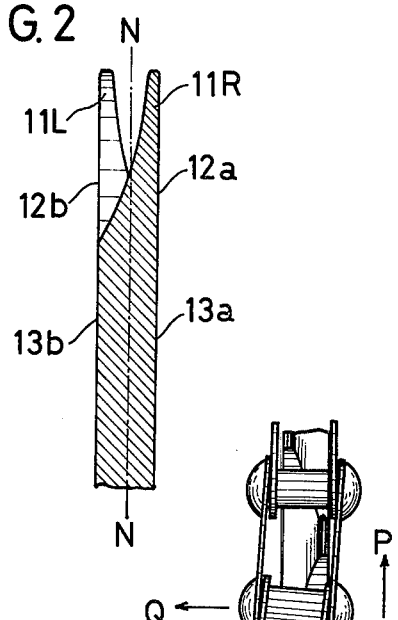
FIG. 2 is an enlarged fragmentary section of the sprocket wheel of FIG. 1, showing the tooth arrangement thereof in detail.

Referring now to the drawings, the sprocket wheel 10 according to the present invention has teeth, which are generally designated by reference numeral 11, integrally formed along the periphery thereof. Said teeth 11 are bilaterally zigzaged like those of a saw blade, and more particularly are set to the right and left, alternatively and symmetrically with respect to a center line N—N (FIG. 2). As clearly shown in FIG. 2, each of the right-sided teeth 11R has a flat vertical wall 12a preferably formed to be substantially flush with the righthand side wall 13a of the wheel body, so that an easier chain shifting effect may be achieved. Likewise, a flat vertical wall 12b of each of the left-sided teeth 11L is formed to be substantially flush with the lefthand side wall 13b of the wheel body.

Figure 3:
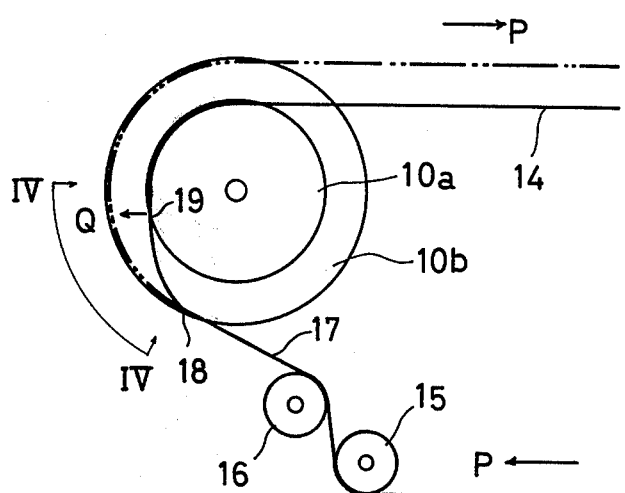
FIG. 3 is a schematic diagram illustrating the chain shifting operation according the present invention, in which the thick solid line indicates the running chain at an initial stage where it starts to shift from a smaller sprocket wheel onto a larger sprocket wheel and the phantom line denotes the same chain at a subsequent stage where it has finished shifting onto the larger sprocket wheel.

In the speed down operation, the running chain 14 must be shifted from a smaller sprocket wheel 10a onto a selected larger sprocket wheel 10b. As particularly shown in FIGS. 3 and 4, when the derailleur is controlled so that its tension pulley 15 loosens the chain tension and at the same time its guide pulley 16 moves toward the larger sprocket wheel 10b, the chain is partially swung at position 17 toward said larger sprocket wheel. In the next stage, the chain element 17 advances in the direction of the arrow P to position 18, where the chain 14 starts to shift onto the larger sprocket wheel 10b. The operation of this stage can be easily carried out by means of any available derailleur, and therefore it is not the subject matter of the present invention.

Figure 4:
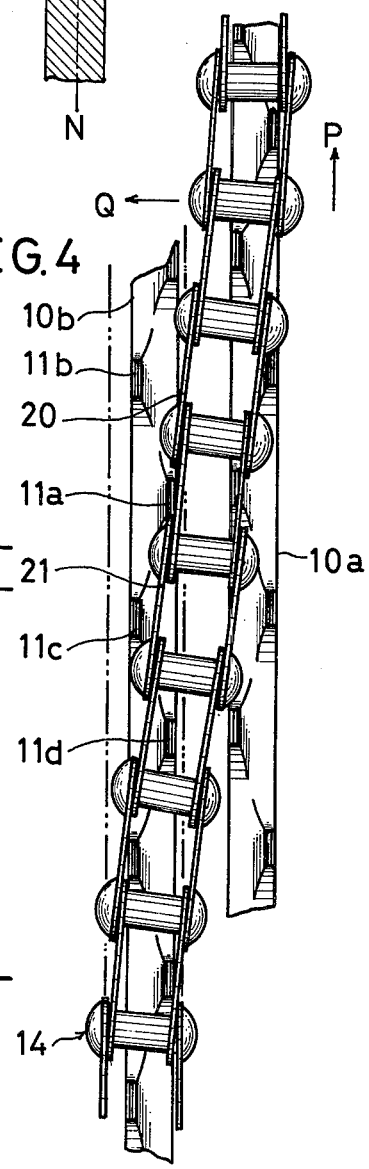
FIG. 4 is an enlarged, somewhat schematic elevation taken in the direction of the arrows substantially along the arcuate line IV—IV of FIG. 3.

The problem to which the present invention is directed relates to the next stage of the operation where the chain element 19 as it is running ahead of said chain element 18 and is still being conveyed around the smaller sprocket wheel 10a starts to engageably transfer to the larger sprocket wheel 10b. At this stage, when the chain 14 climbs up the side wall of the larger sprocket wheel 10b in the direction of arrow Q and gains access to some of the sprocket teeth, it is observed that the most accessible right-sided tooth 11a is engageably received between a pair of adjacent outside link plates 20 and 21 of the chain 14 as shown in FIG. 4. Thus, the chain is prevented not only from skidding along a series of side wall surfaces of the teeth but also from falling down. Thus, the proper chain tension is maintained, whereby the chain is allowed to transfer onto the desired sprocket wheel as said wheel rotates. It is because of the zigzag teeth arrangement, according to the present invention, that such a function is achieved.

In this connection, it will be readily understood that each tooth end should preferably be formed narrower than conventional teeth because the narrower the tooth end, the more easily it can be received between the pair of chain link plates 20 and 21. It should be pointed out that teeth 11b and 11c, respectively, positioned in front and in the rear of said tooth 11a are set aside to the left so as to clear the track for the running chain 14. Further, it was also observed by way of experiment that, if the chain should fail to catch the said first tooth 11a between said link plates 20, 21, the next right-sided tooth 11d can be caught without fail substantially in the same manner.

In climbing up the side wall of the larger sprocket wheel 10b, it is apparently easier for the chain to approach the more accessible side teeth than the prior art teeth arranged in a line, uniformly, along the circumference of the sprocket wheel, because the flexibility of the chain is quite limited and therefore a slight distance between the side wall of the wheel body and the conventionally arranged tooth end is a great hindrance to facilitates the chain shift.

According to the present invention, this great hindrance to the chain shift is eliminated by forming the right side wall 12a of the right-sided teeth 11R to be substantially flush with the side wall surface 13a of the sprocket wheel body. Thus, as soon as the chain 14 is placed in a relative position with respect to the sprocket teeth as shown in FIG. 4, the chain 14 is permitted to easily and firmly seize the initial right-sided tooth 11a and is consequently pulled up onto the larger sprocket wheel 10b as shown in the phantom lines of FIGS. 3 and 4.

Figure 5:
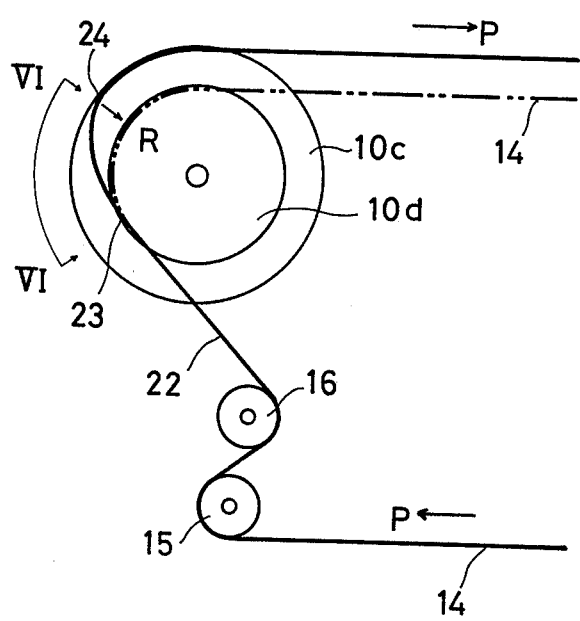
FIG. 5 is an operational diagram similar to FIG. 3, illustrating the chain starting to shift from a larger sprocket wheel onto a smaller one.
Figure 6:
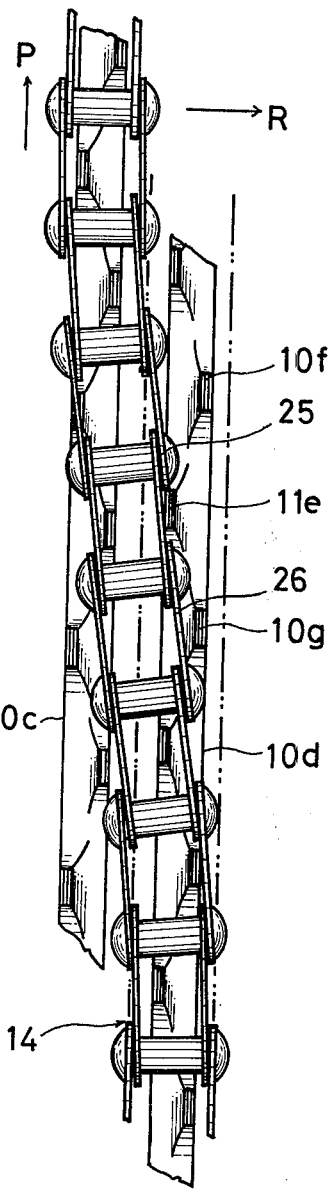
FIG. 6 is a similar elevational view to FIG. 4, but taken along the line VI—VI of FIG. 5.

In the speed up operation, the chain 14 must be shifted from a larger sprocket wheel 10c onto a selected smaller sprocket wheel 10d. As particularly shown in FIGS. 5 and 6, when the derailleur is controlled so that the tension pulley 15 acts to increase the chain tension and simultaneously the guide pulley 16 moves toward the smaller sprocket wheel 10d, the chain 14 is also swung together at position 22. As the chain element 22 advances in the direction of arrow P to position 23, the chain 14 starts to shift over to the smaller sprocket wheel 10d. As soon as the relative position as shown in FIG. 6 with respect to the sprocket teeth is held, the initial left-sided tooth 11e is received between a pair of adjacent link plates 25 and 26 for maintaining proper chain tension. Consequently, as the smaller sprocket wheel 10c rotates, the chain part 24 is pulled down thereonto. In this connection, it is also to be noted that the teeth 10f and 10g are set to the right side for clearing the path of the running chain 14. The desired speed up operation is finished as the chain 14 finally engages and is conveyed around the smaller sprocket wheel 10d as shown in the phantom lines of FIGS. 5 and 6.

While the illustrated and described embodiment represents the preferred form of the present invention, it is to be understood that modifications will occur to those skilled in the art without departing from the spirit of the invention. The scope of the present invention is therefore to be determined solely by the appended claims.

I claim:

1. A bicycle sprocket wheel comprising a bicycle sprocket wheel body containing a plurality of teeth integrally formed along the peripheral surface of the sprocket wheel, said teeth having a base portion and a free end portion and being alternately disposed on the left and right side of said peripheral surface, said left and right side teeth being flush with the side of the sprocket wheel body and tapered from their base portion of their narrower free end portion.

2. The bicycle sprocket wheel of claim 1, wherein the teeth extend perpendicularly from the peripheral surface of the sprocket wheel body.

3. A multi-speed free wheel assembly for a bicycle comprising a plurality of sprocket wheels and at least one chain means, each of said sprocket wheels comprising a plurality of teeth integrally formed along the peripheral surface of the sprocket wheel, said teeth having a base portion and a free end portion and being alternately disposed on the left and right sides of said peripheral surface, said left and right side teeth being flush with the side of the sprocket wheel body and tapered from their base portion to their narrower free end portion, said chain means being operatively associated with said sprocket wheels so that lateral shifting of the chain means between sprocket wheels is facilitated.

4. The bicycle sprocket wheel of claim 3, wherein the teeth extend perpendicularly from the peripheral surface of the sprocket wheel body.

* * * * *